US009599197B1

(12) United States Patent
Park et al.

(10) Patent No.: US 9,599,197 B1
(45) Date of Patent: Mar. 21, 2017

(54) PLANETARY GEAR TRAIN OF AUTOMATIC TRANSMISSION FOR VEHICLE

(71) Applicant: Hyundai Motor Company, Seoul (KR)

(72) Inventors: JongSool Park, Hwaseong-si (KR); Dong Hwan Hwang, Seoul (KR); Seong Wook Hwang, Gunpo-si (KR); Jong Soo Kim, Seoul (KR); Chang Wook Lee, Suwon-si (KR); Wonmin Cho, Hwaseong-si (KR); Hyun Sik Kwon, Seoul (KR); KyeongHun Lee, Seoul (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/943,466

(22) Filed: Nov. 17, 2015

(30) Foreign Application Priority Data

Sep. 14, 2015 (KR) .................. 10-2015-0129863

(51) Int. Cl.
*F16H 3/62* (2006.01)
*F16H 3/66* (2006.01)
(52) U.S. Cl.
CPC ....... *F16H 3/66* (2013.01); *F16H 2200/0065* (2013.01); *F16H 2200/2012* (2013.01); *F16H 2200/2046* (2013.01)
(58) Field of Classification Search
None
See application file for complete search history.

(56) References Cited

U.S. PATENT DOCUMENTS

| 8,231,501 | B2* | 7/2012 | Gumpoltsberger | ....... F16H 3/66 475/284 |
| 8,246,504 | B2* | 8/2012 | Gumpoltsberger | ....... F16H 3/66 475/275 |
| 8,403,803 | B2* | 3/2013 | Gumpoltsberger | ....... F16H 3/66 475/276 |
| 8,657,717 | B2* | 2/2014 | Gumpoltsberger | ....... F16H 3/66 475/280 |
| 8,663,056 | B2* | 3/2014 | Gumpoltsberger | ....... F16H 3/66 475/276 |
| 2012/0149525 | A1 | 6/2012 | Gumpoltsberger et al. | |

* cited by examiner

*Primary Examiner* — Dirk Wright
(74) *Attorney, Agent, or Firm* — Morgan, Lewis & Bockius LLP

(57) ABSTRACT

A planetary gear train of an automatic transmission for a vehicle may include an input shaft; an output shaft; a first to fourth planetary gear sets; and six friction elements disposed between at least one rotation element among the twelve rotation elements and another rotation element or a transmission housing, wherein the input shaft is continuously connected to the second rotation element, the output shaft is continuously connected to the eleventh rotation element, the first rotation element is continuously connected to the fourth rotation element, the fifth rotation element is continuously connected to the eighth rotation element, the sixth rotation element is continuously connected to the eleventh rotation element, the ninth rotation element is continuously connected to the tenth rotation element, the second rotation element is selectively connected to the third rotation element, three friction elements among the six friction elements are operated at each speed stage.

11 Claims, 2 Drawing Sheets

FIG. 2

| Speed stage | Friction element ||||||  Gear ratio | Step ratio | Span of gear ratio |
|---|---|---|---|---|---|---|---|---|---|
|  | C1 | C2 | C3 | C4 | B1 | B2 |  |  |  |
| D1 | ● | ● |  |  | ● |  | 4.558 | 1.670 | 8.9 |
| D2 |  | ● | ● |  | ● |  | 2.729 | 1.551 |  |
| D3 |  |  | ● | ● | ● |  | 1.759 | 1.328 |  |
| D4 | ● |  |  | ● | ● |  | 1.325 | 1.325 |  |
| D5 | ● | ● |  | ● |  |  | 1 | 1.221 |  |
| D6 | ● |  |  | ● |  | ● | 0.819 | 1.182 |  |
| D7 |  |  | ● | ● |  | ● | 0.693 | 1.175 |  |
| D8 |  | ● |  | ● |  | ● | 0.59 | 1.148 |  |
| D9 |  | ● | ● |  |  | ● | 0.514 |  |  |
| REV | ● |  |  |  | ● | ● | -3.81 |  |  |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0129863 filed on Sep. 14, 2015, the entire contents of which is incorporated herein for all purposes by this reference.

BACKGROUND OF THE INVENTION

Field of the Invention

The present invention relates to a planetary gear train of an automatic transmission for a vehicle. More particularly, the present invention relates to a planetary gear train of an automatic transmission for a vehicle which improves power delivery performance and fuel efficiency as a consequence of achieving nine forward or more speed stages using a minimum number of constituent elements, enlarging a span of gear ratios, and linearly increasing or decreasing step ratios between speed stages.

Description of Related Art

In recent years, a rise in oil price causes dashing into unlimited competition for enhancing fuel efficiency.

As a result, a research into reduction of a weight and the enhancement of the fuel efficiency through down sizing is conducted in the case of an engine and a research for simultaneously securing operability and fuel efficiency competitiveness through multiple speed stages are conducted in the case of an automatic transmission.

However, in the automatic transmission, as the number of speed stages increases, the number of internal components increase, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multiple speed stages.

In this aspect, in recent years, 8-speed automatic transmission tends to be implemented and the research and development of a planetary gear train capable of implementing more speed stages has also been actively conducted.

Since a span of gear ratios of the recent 8-speed automatic transmission is merely 6.5 to 7.5, the 8-speed automatic transmission has no great effect of improving fuel efficiency.

In addition, since step ratios between speed stages may not be increased or decreased linearly in a case in which a span of gear ratios of the 8-speed automatic transmission is greater than or equal to 9.0, driving efficiency of an engine and drivability of a vehicle may be deteriorated. Accordingly, there is a need for development of a high efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency by achieving nine forward or more speed stages and one reverse or more speed stage using a minimum number of constituent elements, by enlarging a span of gear ratios, and by linearly increasing or decreasing step ratios between speed stages.

An exemplary embodiment of the present invention provides a planetary gear train of an automatic transmission for a vehicle that may include an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; and six friction elements disposed between at least one rotation element among the twelve rotation elements and another rotation element or a transmission housing, wherein the input shaft is continuously connected to the second rotation element, the output shaft is continuously connected to the eleventh rotation element, the first rotation element is continuously connected to the fourth rotation element, the fifth rotation element is continuously connected to the eighth rotation element, the sixth rotation element is continuously connected to the eleventh rotation element, the ninth rotation element is continuously connected to the tenth rotation element, the second rotation element is selectively connected to the third rotation element, three friction elements among the six friction elements are operated at each speed stage.

The ninth rotation element may be selectively connected to the transmission housing, the seventh rotation element may be selectively connected to the transmission housing, the third rotation element may be selectively connected to the twelfth rotation element, the third rotation element may be selectively connected to the fifth rotation element, the first rotation element may be selectively connected to the seventh rotation element.

A sun gear, a planet carrier, and a ring gear of the first planetary gear set may be set as the first, second, and third rotation elements, a sun gear, a planet carrier, and a ring gear of the second planetary gear set may be set as the fourth, fifth, and sixth rotation elements, a sun gear, a planet carrier, and a ring gear of the third planetary gear set may be set as the seventh, eighth, and ninth rotation elements, and a sun gear, a planet carrier, and a ring gear of the fourth planetary gear set may be set as the tenth, eleventh, and twelfth rotation elements.

Another exemplary embodiment of the present invention provides a planetary gear train of an automatic transmission for a vehicle that may include an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first rotation shaft including the first rotation element and the fourth rotation element; a second rotation shaft including the second rotation element and directly connected to the input shaft; a third rotation shaft including the third rotation element and selectively connected to the second rotation shaft; a fourth rotation shaft including the fifth rotation element and the eighth rotation element and selectively connected to the third rotation shaft; a fifth rotation shaft including the sixth rotation element and the eleventh rotation element and directly connected to the output shaft; a sixth rotation shaft including the seventh rotation element and selectively connected to the first rotation shaft and the transmission housing; a seventh rotation shaft including the ninth rotation element and the tenth rotation element and selectively connected to the transmission housing; and an eighth rotation shaft including the twelfth rotation element and selectively connected to the third rotation shaft.

The first planetary gear set may be a single pinion planetary gear set and may include a first sun gear that is the first rotation element, a first planet carrier that is the second rotation element, and a first ring gear that is the third rotation element, the second planetary gear set may be a single pinion planetary gear set and may include a second sun gear that is the fourth rotation element, a second planet carrier that is the fifth rotation element, and a second ring gear that is the sixth rotation element, the third planetary gear set may be a single pinion planetary gear set and may include a third sun gear that is the seventh rotation element, a third planet carrier that is the eighth rotation element, and a third ring gear that is the ninth rotation element, and the fourth planetary gear set may be a single pinion planetary gear set and may include a fourth sun gear that is the tenth rotation element, a fourth planet carrier that is the eleventh rotation element, and a fourth ring gear that is the twelfth rotation element.

The planetary gear train may further include a first clutch disposed between the second rotation shaft and the third rotation shaft; a second clutch disposed between the first rotation shaft and the sixth rotation shaft; a third clutch disposed between the third rotation shaft and the fourth rotation shaft; a fourth clutch disposed between the third rotation shaft and the eighth rotation shaft; a first brake disposed between the seventh rotation shaft and the transmission housing; and a second brake disposed between the sixth rotation shaft and the transmission housing.

A first forward speed stage may be achieved by operation of the first and second clutches and the first brake, a second forward speed stage may be achieved by operation of the second and third clutches and the first brake, a third forward speed stage may be achieved by operation of the third and fourth clutches and the first brake, a fourth forward speed stage may be achieved by operation of the first and fourth clutches and the first brake, a fifth forward speed stage may be achieved by operation of the first, second, and fourth clutches, a sixth forward speed stage may be achieved by operation of the first and fourth clutches and the second brake, a seventh forward speed stage may be achieved by operation of the third and fourth clutches and the second brake, an eighth forward speed stage may be achieved by operation of the second and fourth clutches and the second brake, a ninth forward speed stage may be achieved by operation of the second and third clutches and the second brake, a reverse speed stage may be achieved by operation of the first clutch and the first and second brakes.

Yet another exemplary embodiment of the present invention provides a planetary gear train of an automatic transmission for a vehicle that may include an input shaft receiving torque of an engine; an output shaft outputting changed torque; a first planetary gear set including a first sun gear, a first planet carrier, and a first ring gear; a second planetary gear set including a second sun gear, a second planet carrier, and a second ring gear; a third planetary gear set including a third sun gear, a third planet carrier, and a third ring gear; a fourth planetary gear set including a fourth sun gear, a fourth planet carrier, and a fourth ring gear; a first rotation shaft including the first sun gear and the second sun gear; a second rotation shaft including the first planet carrier and directly connected to the input shaft; a third rotation shaft including the first ring gear and selectively connected to the second rotation shaft; a fourth rotation shaft including the second planet carrier and the third planet carrier and selectively connected to the third rotation shaft; a fifth rotation shaft including the second ring gear and the third planet carrier and directly connected to the output shaft; a sixth rotation shaft including the third sun gear and selectively connected to the first rotation shaft and a transmission housing; a seventh rotation shaft including the third ring gear and the fourth sun gear and selectively connected to the transmission housing; an eighth rotation shaft including the fourth ring gear and selectively connected to the third rotation shaft; and six friction elements disposed between at least one rotation shaft among the eight rotation shafts and another rotation shaft or the transmission housing.

Each of the first, second, third, and fourth planetary gear sets may be a single pinion planetary gear set.

The six friction elements may include a first clutch disposed between the second rotation shaft and the third rotation shaft; a second clutch disposed between the first rotation shaft and the sixth rotation shaft; a third clutch disposed between the third rotation shaft and the fourth rotation shaft; a fourth clutch disposed between the third rotation shaft and the eighth rotation shaft; a first brake disposed between the seventh rotation shaft and the transmission housing; and a second brake disposed between the sixth rotation shaft and the transmission housing.

A first forward speed stage may be achieved by operation of the first and second clutches and the first brake, a second forward speed stage may be achieved by operation of the second and third clutches and the first brake, a third forward speed stage may be achieved by operation of the third and fourth clutches and the first brake, a fourth forward speed stage may be achieved by operation of the first and fourth clutches and the first brake, a fifth forward speed stage may be achieved by operation of the first, second, and fourth clutches, a sixth forward speed stage may be achieved by operation of the first and fourth clutches and the second brake, a seventh forward speed stage may be achieved by operation of the third and fourth clutches and the second brake, an eighth forward speed stage may be achieved by operation of the second and fourth clutches and the second brake, a ninth forward speed stage may be achieved by operation of the second and third clutches and the second brake, a reverse speed stage may be achieved by operation of the first clutch and the first and second brakes.

An exemplary embodiment of the present invention may achieve nine forward speed stages and one reverse speed stage by combining four planetary gear sets that are simple planetary gear sets with six friction elements.

In addition, engine driving efficiency may be maximized by achieving a span of gear ratios to be greater than or equal to 8.0.

In addition, drivability such as acceleration before and after the shift and rhythm of engine speed may be improved by linearly increasing or decreasing step ratios between speed stages.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the planetary gear train according to an exemplary embodiment of the present invention.

Figure 1:
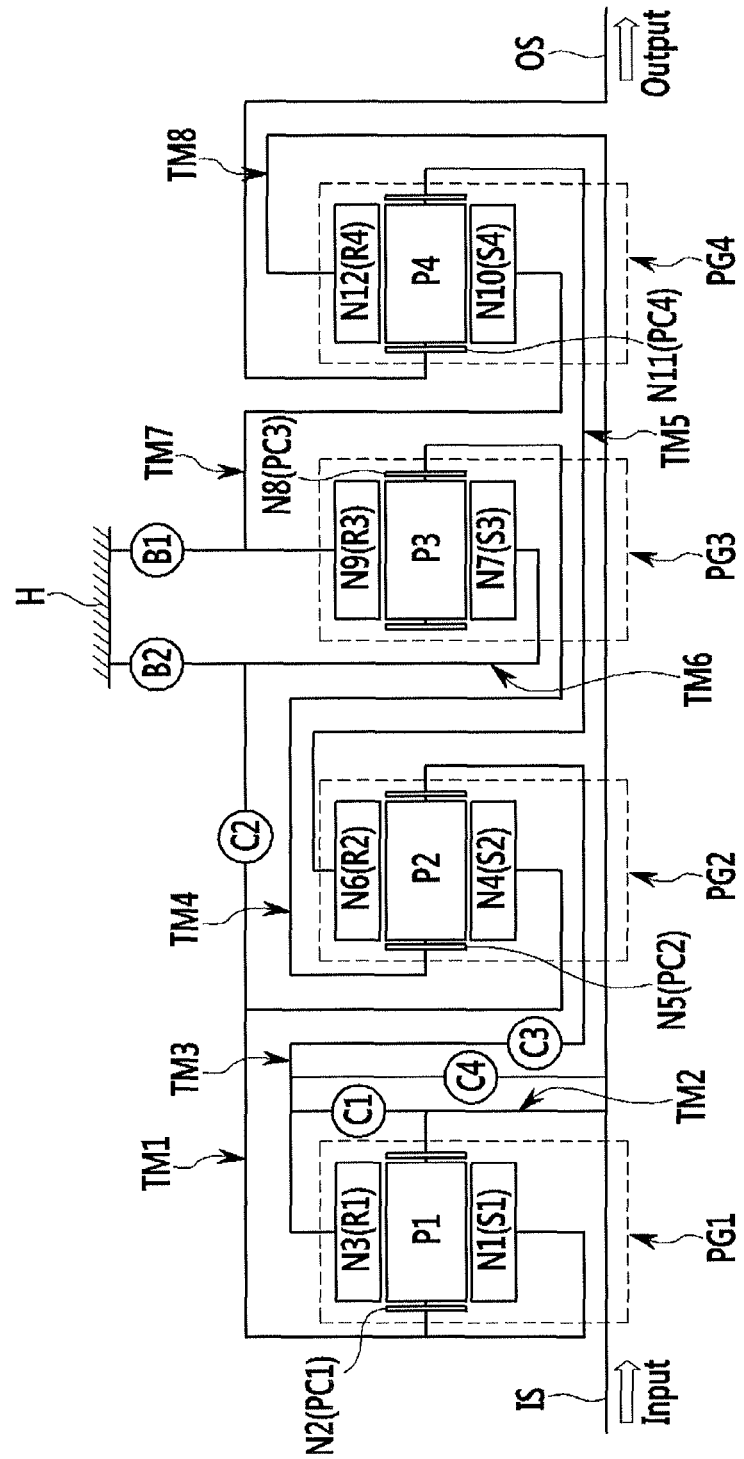
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

However, parts which are not related with the description are omitted for clearly describing the exemplary embodiment of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, fourth planetary gear sets PG1, PG2, PG3, and PG4 disposed on the same axis, an input shaft IS, an output shaft OS, eight rotations shafts TM1 to TM8 including at least one rotation elements of the first, second, third, and fourth planetary gear sets PG1, PG2, PG3, and PG4, six friction elements C1 to C4 and B1 to B2, and a transmission housing H.

As a result, torque input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1 of a first rotation element N1, a first planet carrier PC1 of a second rotation element N2 rotatably supporting a first pinion P1 externally engaged the first sun gear S1, and a first ring gear R1 of a third rotation element N3 internally engaged with the first pinion P1.

The second planetary gear set PG2 is a single pinion planetary gear set and includes a second sun gear S2 of a fourth rotation element N4, a second planet carrier PC2 of a fifth rotation element N5 rotatably supporting a second pinion P2 externally engaged the second sun gear S2, and a second ring gear of a sixth rotation element N6 internally engaged with the second pinion P2.

The third planetary gear set PG3 is a single pinion planetary gear set and includes a third sun gear S3 of a seventh rotation element N7, a third planet carrier PC3 of an eighth rotation element N8 rotatably supporting a third pinion P3 externally engaged with the third sun gear S3, and a third ring gear R3 of a ninth rotation element N9 internally engaged with the third pinion P3.

The fourth planetary gear set PG4 is a single pinion planetary gear set and includes a fourth sun gear S4 of a tenth rotation element N10, a fourth planet carrier PC4 of an eleventh rotation element N11 rotatably supporting a fourth pinion P4 externally engaged with the fourth sungear S4, and a fourth ring gear R4 of a twelfth rotation element N12 internally engaged with the fourth pinion P4.

The first rotation element N1 is directly connected to the fourth rotation element N4, the fifth rotation element N5 is directly connected to the eighth rotation element N8, the sixth rotation element N6 is directly connected to the eleventh rotation element N11, the ninth rotation element N9 is directly connected to the tenth rotation element N10, and the first, second, third, and fourth planetary gear sets PG1, PG2, PG3, and PG4 are operated with eight rotation shafts TM1 to TM8.

The eight rotation shafts TM1 to TM8 will be described in further detail.

The first rotation shaft TM1 includes the first rotation element N1, and the fourth rotation element N4.

The second rotation shaft TM2 includes the second rotation element N2, and is directly connected to the input shaft IS so as to be continuously operated as an input element.

The third rotation shaft TM3 includes the third rotation element N3, and is selectively connected to the second rotation shaft TM2.

The fourth rotation shaft TM4 includes the fifth rotation element N5 and the eighth rotation element N8, and is selectively connected to the third rotation shaft TM3.

The fifth rotation shaft TM5 includes the sixth rotation element N6 and the eleventh rotation element N11, and is directly connected to the output shaft OS so as to be continuously operated as an output element.

The sixth rotation shaft TM6 includes the seventh rotation element N7, is selectively connected to the first rotation shaft TM1, and is selectively connected to the transmission housing H.

The seventh rotation shaft TM7 includes the ninth rotation element N9 and the tenth rotation element N10, and is selectively connected to the transmission housing H.

The eighth rotation shaft TM8 includes the twelfth rotation element N12, and is selectively connected to the third rotation shaft TM3.

In addition, four clutches C1, C2, C3, and C4 which are friction elements are disposed at connection portions between any two rotation shafts.

In addition, two brakes B1 and B2 which are friction elements are disposed at connection portions between any one rotation shaft and the transmission housing H.

The six friction elements C1 to C4 and B1 to B2 will be described in further detail.

The first clutch C1 is disposed between the second rotation shaft TM2 and the third rotation shaft TM3 and selectively connects the second rotation shaft TM2 and the third rotation shaft TM3.

The second clutch C2 is disposed between the first rotation shaft TM1 and the sixth rotation shaft TM6 and selectively connects the first rotation shaft TM1 and the sixth rotation shaft TM6.

The third clutch C3 is disposed between the third rotation shaft TM3 and the fourth rotation shaft TM4 and selectively connects the third rotation shaft TM3 and the fourth rotation shaft TM4.

The fourth clutch C4 is disposed between the third rotation shaft TM3 and the eighth rotation shaft TM8 and selectively connects the third rotation shaft TM3 and the eighth rotation shaft TM8.

The first brake B1 is disposed between the seventh rotation shaft TM7 and the transmission housing H and causes the seventh rotation shaft TM7 to be operated as a selective fixed element.

The second brake B2 is disposed between the sixth rotation shaft TM6 and the transmission housing H and causes the sixth rotation shaft TM6 to be operated as a selective fixed element.

The friction elements including the first, second, third, and fourth clutches C1, C2, C3, and C4 and the first and second brakes B1 and B2 may be multi-plates friction elements of wet type that are operated by hydraulic pressure.

FIG. 2 is an operation chart of friction elements at each speed stage in the planetary gear train according to an exemplary embodiment of the present invention.

As shown in FIG. 2, three friction elements are operated at each speed stage in the planetary gear train according to an exemplary embodiment of the present invention. Shifting processes in the exemplary embodiment of the present invention will be described in further detail.

If the first and second clutch C1 and C2 and the first brake B1 are operated at a first forward speed stage D1, the second rotation shaft TM2 is connected to the third rotation shaft TM3, the first rotation shaft TM1 is connected to the sixth rotation shaft TM6, rotation speed of the input shaft IS is input to the second rotation shaft TM2, and the seventh rotation shaft TM7 is operated as the fixed element. Therefore, the first forward speed stage is achieved.

If the second and third clutches C2 and C3 and the first brake B1 are operated at a second forward speed stage D2, the first rotation shaft TM1 is connected to the sixth rotation shaft TM6, the third rotation shaft TM3 is connected to the fourth rotation shaft TM4, rotation speed of the input shaft IS is input to the second rotation shaft TM2, and the seventh rotation shaft TM7 is operated as the fixed element. Therefore, the second forward speed stage is achieved.

If the third and fourth clutches C3 and C4 and the first brake B1 are operated at a third forward speed stage D3, the third rotation shaft TM3 is connected to the fourth rotation shaft TM4, the third rotation shaft TM3 is connected to the eighth rotation shaft TM8, rotation speed of the input shaft IS is input to the second rotation shaft TM2, and the seventh rotation shaft TM7 is operated as the fixed element. Therefore, the third forward speed stage is achieved.

If the first and fourth clutch C1 and C4 and the first brake B1 are operated at a fourth forward speed stage D4, the second rotation shaft TM2 is connected to the third rotation shaft TM3, the third rotation shaft TM3 is connected to the eighth rotation shaft TM8, rotation speed of the input shaft IS is input to the second rotation shaft TM2, and the seventh rotation shaft TM7 is operated as the fixed element. Therefore, the fourth forward speed stage is achieved.

If the first, second and fourth clutches C1, C2 and C4 are operated at a fifth forward speed stage D5, the second rotation shaft TM2 is connected to the third rotation shaft TM3, the first rotation shaft TM1 is connected to the sixth rotation shaft TM6, and the third rotation shaft TM3 is connected to the eighth rotation shaft TM8. Therefore, all the planetary gear sets become direct-coupling states. At this state, if rotation speed of the input shaft IS is input to the second rotation shaft TM2, the fifth forward speed stage is achieved. At the fifth forward speed stage, rotation speed that is the same as that of the input shaft IS is output.

If the first and fourth clutches C1 and C4 and the second brake B2 are operated at a sixth forward speed stage D6, the second rotation shaft TM2 is connected to the third rotation shaft TM3, the third rotation shaft TM3 is connected to the eighth rotation shaft TM8, rotation speed of the input shaft IS is input to the second rotation shaft TM2, and the sixth rotation shaft TM6 is operated as the fixed element. Therefore, the sixth forward speed stage is achieved.

If the third and fourth clutches C3 and C4 and the second brake B2 are operated at a seventh forward speed stage D7, the third rotation shaft TM3 is connected to the fourth rotation shaft TM4, the third rotation shaft TM3 is connected to the eighth rotation shaft TM8, rotation speed of the input shaft IS is input to the second rotation shaft TM2, and the sixth rotation shaft TM6 is operated as the fixed element. Therefore, the seventh forward speed stage is achieved.

If the second and fourth clutches C2 and C4 and the second brake B2 are operated at an eighth forward speed stage D8, the first rotation shaft TM1 is connected to the sixth rotation shaft TM6, the third rotation shaft TM3 is connected to the eighth rotation shaft TM8, rotation speed of the input shaft IS is input to the second rotation shaft TM2, and the sixth rotation shaft TM6 is operated as the fixed element. Therefore, the eighth forward speed stage is achieved.

If the second and third clutches C2 and C3 and the second brake B2 are operated at a ninth forward speed stage D9, the first rotation shaft TM1 is connected to the sixth rotation shaft TM6, the third rotation shaft TM3 is connected to the fourth rotation shaft TM4, rotation speed of the input shaft IS is input to the second rotation shaft TM2, and the sixth rotation shaft TM6 is operated as the fixed element. Therefore, the ninth forward speed stage is achieved.

If the first clutch C1 and first and second brakes B1 and B2 are operated at a reverse speed stage REV, the second rotation shaft TM2 is connected to the third rotation shaft TM3, rotation speed of the input shaft IS is input to the second rotation shaft TM2, and the seventh rotation shaft TM7 and the sixth rotation shaft TM6 are operated as the fixed elements. Therefore, the reverse speed stage is achieved.

The planetary gear train according to an exemplary embodiment of the present invention may achieve nine forward speed stages and one reverse speed stage by controlling four planetary gear sets PG1, PG2, PG3, and PG4 with four clutches C1, C2, C3, and C4 and tow brakes B1 and B2.

In addition, step ratios between speed stages are 1.2 or more except for between the sixth and seventh forward speed stages, between the seventh and eighth forward speed stages, and between the eighth and ninth forward speed stages, and linearity of step ratios between speed stages can be secured. Thus, drivability such as acceleration before and after the shift and rhythm of engine speed may be improved.

In addition, engine driving efficiency may be maximized by achieving a span of gear ratios to be near to 9.0.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including a tenth rotation element, an eleventh rotation element, and a twelfth rotation element; and
   six friction elements disposed between at least one rotation element among the twelve rotation elements and another rotation element or a transmission housing,
   wherein the input shaft is continuously connected to the second rotation element,
   the output shaft is continuously connected to the eleventh rotation element,
   the first rotation element is continuously connected to the fourth rotation element,
   the fifth rotation element is continuously connected to the eighth rotation element,
   the sixth rotation element is continuously connected to the eleventh rotation element,
   the ninth rotation element is continuously connected to the tenth rotation element,
   the second rotation element is selectively connected to the third rotation element,
   three friction elements among the six friction elements are operated at each speed stage.

2. The planetary gear train of claim 1,
   wherein the ninth rotation element is selectively connected to the transmission housing,
   the seventh rotation element is selectively connected to the transmission housing,
   the third rotation element is selectively connected to the twelfth rotation element,
   the third rotation element is selectively connected to the fifth rotation element,
   the first rotation element is selectively connected to the seventh rotation element.

3. The planetary gear train of claim 1,
   wherein a sun gear, a planet carrier, and a ring gear of the first planetary gear set are set as the first rotation element, the second rotation element, and the third rotation element,
   a sun gear, a planet carrier, and a ring gear of the second planetary gear set are set as the fourth rotation element, the fifth rotation element, and the sixth rotation element,
   a sun gear, a planet carrier, and a ring gear of the third planetary gear set are set as the seventh rotation element, the eighth rotation element, and the ninth rotation element, and
   a sun gear, a planet carrier, and a ring gear of the fourth planetary gear set are set as the tenth, eleventh, and twelfth rotation elements.

4. A planetary gear train of an automatic transmission for a vehicle, comprising:
   an input shaft receiving torque of an engine;
   an output shaft outputting changed torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including a tenth rotation element, an eleventh rotation element, and a twelfth rotation element;
   a first rotation shaft including the first rotation element and the fourth rotation element;
   a second rotation shaft including the second rotation element and directly connected to the input shaft;
   a third rotation shaft including the third rotation element and selectively connected to the second rotation shaft;
   a fourth rotation shaft including the fifth rotation element and the eighth rotation element and selectively connected to the third rotation shaft;
   a fifth rotation shaft including the sixth rotation element and the eleventh rotation element and directly connected to the output shaft;
   a sixth rotation shaft including the seventh rotation element and selectively connected to the first rotation shaft and the transmission housing;
   a seventh rotation shaft including the ninth rotation element and the tenth rotation element and selectively connected to the transmission housing; and
   an eighth rotation shaft including the twelfth rotation element and selectively connected to the third rotation shaft.

5. The planetary gear train of claim 4,
   wherein the first planetary gear set is a single pinion planetary gear set and includes a first sun gear that is the first rotation element, a first planet carrier that is the second rotation element, and a first ring gear that is the third rotation element, the second planetary gear set is a single pinion planetary gear set and includes a second sun gear that is the fourth rotation element, a second planet carrier that is the fifth rotation element, and a second ring gear that is the sixth rotation element, the third planetary gear set is a single pinion planetary gear set and includes a third sun gear that is the seventh rotation element, a third planet carrier that is the eighth rotation element, and a third ring gear that is the ninth rotation element, and the fourth planetary gear set is a single pinion planetary gear set and includes a fourth sun gear that is the tenth rotation element, a fourth planet carrier that is the eleventh rotation element, and a fourth ring gear that is the twelfth rotation element.

6. The planetary gear train of claim 4, further comprising:
a first clutch disposed between the second rotation shaft and the third rotation shaft;
a second clutch disposed between the first rotation shaft and the sixth rotation shaft;
a third clutch disposed between the third rotation shaft and the fourth rotation shaft;
a fourth clutch disposed between the third rotation shaft and the eighth rotation shaft;
a first brake disposed between the seventh rotation shaft and the transmission housing; and
a second brake disposed between the sixth rotation shaft and the transmission housing.

7. The planetary gear train of claim 6,
wherein a first forward speed stage is achieved by operation of the first and second clutches and the first brake,
a second forward speed stage is achieved by operation of the second and third clutches and the first brake,
a third forward speed stage is achieved by operation of the third and fourth clutches and the first brake,
a fourth forward speed stage is achieved by operation of the first and fourth clutches and the first brake,
a fifth forward speed stage is achieved by operation of the first, second, and fourth clutches,
a sixth forward speed stage is achieved by operation of the first and fourth clutches and the second brake,
a seventh forward speed stage is achieved by operation of the third and fourth clutches and the second brake,
an eighth forward speed stage is achieved by operation of the second and fourth clutches and the second brake,
a ninth forward speed stage is achieved by operation of the second and third clutches and the second brake,
a reverse speed stage is achieved by operation of the first clutch and the first and second brakes.

8. A planetary gear train of an automatic transmission for a vehicle, comprising:
an input shaft receiving torque of an engine;
an output shaft outputting changed torque;
a first planetary gear set including a first sun gear, a first planet carrier, and a first ring gear;
a second planetary gear set including a second sun gear, a second planet carrier, and a second ring gear;
a third planetary gear set including a third sun gear, a third planet carrier, and a third ring gear;
a fourth planetary gear set including a fourth sun gear, a fourth planet carrier, and a fourth ring gear;

a first rotation shaft including the first sun gear and the second sun gear;
a second rotation shaft including the first planet carrier and directly connected to the input shaft;
a third rotation shaft including the first ring gear and selectively connected to the second rotation shaft;
a fourth rotation shaft including the second planet carrier and the third planet carrier and selectively connected to the third rotation shaft;
a fifth rotation shaft including the second ring gear and the third planet carrier and directly connected to the output shaft;
a sixth rotation shaft including the third sun gear and selectively connected to the first rotation shaft and a transmission housing;
a seventh rotation shaft including the third ring gear and the fourth sun gear and selectively connected to the transmission housing;
an eighth rotation shaft including the fourth ring gear and selectively connected to the third rotation shaft; and
six friction elements disposed between at least one rotation shaft among the eight rotation shafts and another rotation shaft or the transmission housing.

9. The planetary gear train of claim 8, wherein each of the first, second, third, and fourth planetary gear sets is a single pinion planetary gear set.

10. The planetary gear train of claim 8, wherein the six friction elements include
a first clutch disposed between the second rotation shaft and the third rotation shaft;
a second clutch disposed between the first rotation shaft and the sixth rotation shaft;
a third clutch disposed between the third rotation shaft and the fourth rotation shaft;
a fourth clutch disposed between the third rotation shaft and the eighth rotation shaft;
a first brake disposed between the seventh rotation shaft and the transmission housing; and
a second brake disposed between the sixth rotation shaft and the transmission housing.

11. The planetary gear train of claim 10,
wherein a first forward speed stage is achieved by operation of the first and second clutches and the first brake,
a second forward speed stage is achieved by operation of the second and third clutches and the first brake,
a third forward speed stage is achieved by operation of the third and fourth clutches and the first brake,
a fourth forward speed stage is achieved by operation of the first and fourth clutches and the first brake,
a fifth forward speed stage is achieved by operation of the first, second, and fourth clutches,
a sixth forward speed stage is achieved by operation of the first and fourth clutches and the second brake,
a seventh forward speed stage is achieved by operation of the third and fourth clutches and the second brake,
an eighth forward speed stage is achieved by operation of the second and fourth clutches and the second brake,
a ninth forward speed stage is achieved by operation of the second and third clutches and the second brake,
a reverse speed stage is achieved by operation of the first clutch and the first and second brakes.

* * * * *